UNITED STATES PATENT OFFICE.

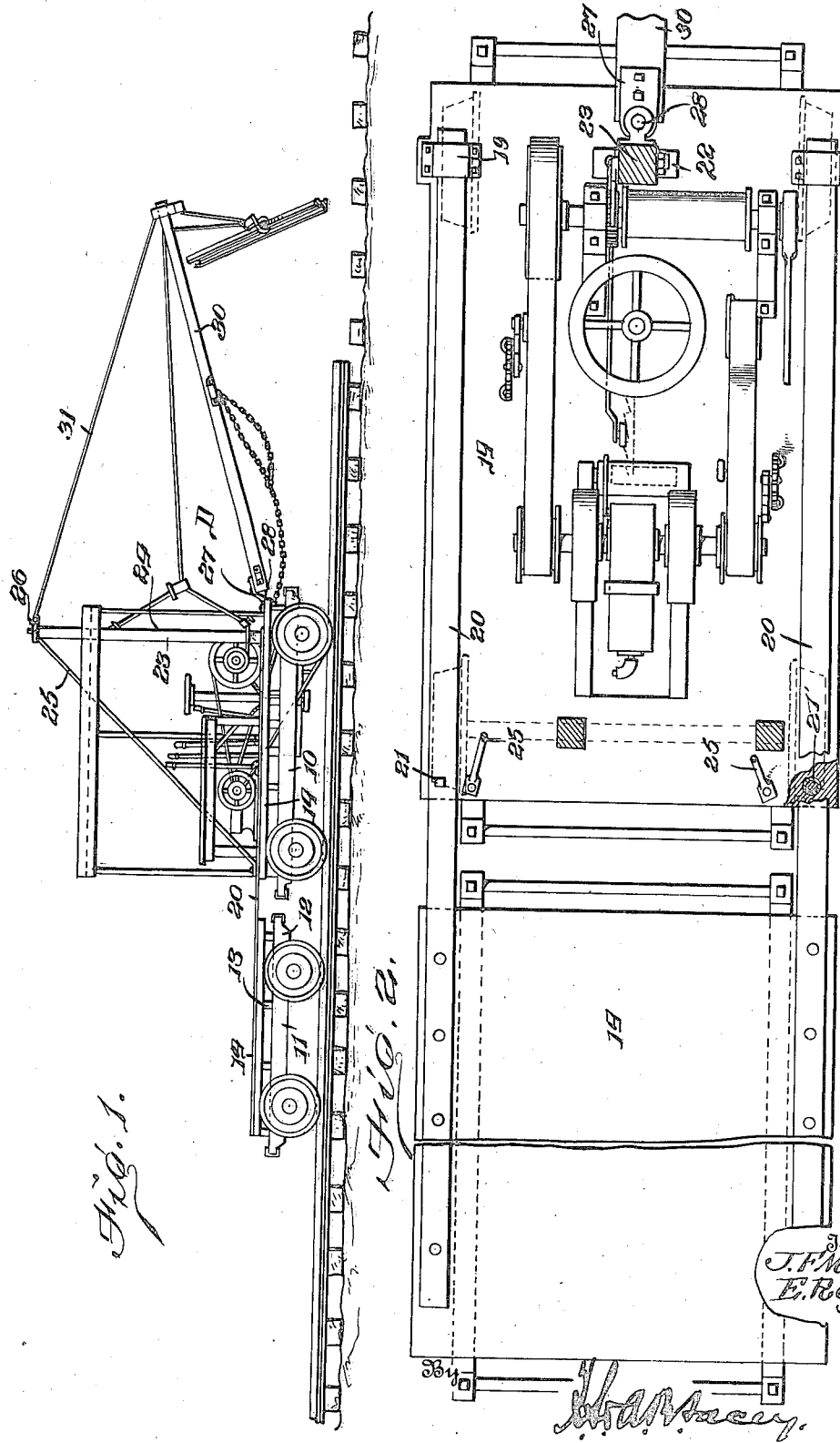

JOHN F. McNALLY AND EDWARD RAYMOND, OF NEWTON, KANSAS.

RAILROAD-TRACK-LAYING MACHINE OR DERRICK.

1,167,578.      Specification of Letters Patent.      Patented Jan. 11, 1916.

Application filed May 9, 1914. Serial No. 837,583.

*To all whom it may concern:*

Be it known that we, JOHN F. McNALLY and EDWARD RAYMOND, citizens of the United States, residing at Newton, in the county of Harvey and State of Kansas, have invented certain new and useful Improvements in Railroad-Track-Laying Machines or Derricks, of which the following is a specification.

Our invention relates to new and useful improvements in track laying machines and derricks for railroad use, the primary object of our invention being the provision of a self-propelled machine adapted to travel along a railway track and provided with a derrick for use in handling ties, rails and other like articles.

A further object of our invention is to construct the body portion proper of our machine in two parts or trucks, one of which is self-propelled and carries the derrick and the other of which serves as a trailer for carrying supplies and the like, the two trucks being detachably secured to each other.

In this connection, a further object of our invention is to so secure the trucks together that during use of the derrick, the trailer serves as an anchor to prevent tilting or displacement of the derrick carrying truck.

In the drawings: Figure 1 is a side elevation of our improved machine, showing the same employed in handling a rail; Fig. 2 is a top plan view of the forward and rear trucks.

Our invention primarily includes two body portions or trucks 10 and 11, each preferably constructed in the form of a conventional four-wheeled truck or flat car. As the main features of construction of both of these trucks are identical, a description of one will suffice for both.

Each truck body primarily includes a plurality of spaced longitudinal sills 12 carrying spaced transverse sills 13 upon which the floor or platform 14 of the truck is supported.

The truck 10, which is the forward or main truck of the machine, is provided at either side, adjacent its forward end, with loop-shaped brackets 19 adapted to receive the forward ends of spaced connecting beam members 20 which are secured to the side portions of the rear truck 11 and which extend beyond the forward end of such truck a sufficient distance to extend throughout practically the entire length of the forward truck and engage at their free ends in these brackets. Coupling pins 21 are passed through openings formed in these connecting members and into sockets or openings 21' formed in the rear portion of the forward truck and serve to prevent swinging movement of one truck with respect to the other and so relieve the brackets 19 of a considerable part of the strain which they would otherwise have to withstand and to at the same time keep the trucks in alinement with each other and in proper spaced relation. It will of course be clear that the trucks may be readily uncoupled by removing these coupling pins and moving the trucks away from each other to free the coupling members 20 from their brackets 19. The rear truck 11 serves as a supply car for ties, rails, hand tools and other like articles and also as an anchor for the forward truck as will be later explained. The forward truck carries the motive power of the machine and also the hoist or derrick indicated generally by the reference character D.

A plurality of detachable securing plates or brackets 22 secure the derrick mast 23 in vertical position directly over the forward axle of the forward truck 10, this mast being held against swinging movement to either side by guy rods 24 secured at their upper ends to the intermediate side portions of the mast and at their lower ends to the sides of the forward truck body. The mast is further secured against side movement and also against forward tilting movement by guy rods 25 connected at their upper ends to a cap plate 26 upon the upper end of the mast and at their lower ends to the rear corner portions of the truck body.

Extending forwardly from the base of the mast 23 is a bearing block 27 and a pivot pin 28 is journaled in this bearing block and in the floor of the truck, the pin passing through the pivot plate 29 secured to the lower end of the derrick boom 30, the derrick boom being therefore free for swinging movement in a horizontal plane. The free end of the boom is supported by a stay cable 31 connecting such end with the cap plate 26 of the mast.

Having thus described the invention, what is claimed as new is:

1. In a track laying machine, two independent trucks mounted upon a track, the one in advance of the other, a derrick located upon the front portion of the forward truck, longitudinal members secured to the side portions of the rear truck and projecting forwardly therefrom along opposite sides of the forward truck, and means detachably connecting the longitudinal members to the front and rear portions of the forward truck.

2. In a track laying machine, two independent trucks disposed the one in advance of the other, a derrick mounted centrally upon the front end of the forward truck and arranged to swing in advance thereof, brackets near the front corners of the forward truck, longitudinal members secured to the rear truck and projecting forwardly therefrom along the sides of the front truck and engaging the said brackets thereof, and fastening means connecting such longitudinal members to the rear corner portions of the forward truck.

In testimony whereof we affix our signatures in presence of two witnesses.

JOHN F. McNALLY. [L. S.]
EDWARD RAYMOND. [L. S.]

Witnesses:
U. G. CHARLES,
OTTO R. SOUDERS.